United States Patent
Kobayashi et al.

(10) Patent No.: US 10,950,835 B2
(45) Date of Patent: Mar. 16, 2021

(54) BATTERY PACK

(71) Applicant: TOYOTA JIDOSHA KABUSHIKI KAISHA, Toyota (JP)

(72) Inventors: Keiichiro Kobayashi, Nisshin (JP); Ryo Kanada, Toyota (JP); Masahiko Ushizawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 233 days.

(21) Appl. No.: 15/953,574

(22) Filed: Apr. 16, 2018

(65) Prior Publication Data
US 2018/0309103 A1    Oct. 25, 2018

(30) Foreign Application Priority Data

Apr. 20, 2017    (JP) .............................. JP2017-083785

(51) Int. Cl.
| | | |
|---|---|---|
| *H01M 2/14* | (2006.01) | |
| *H01M 10/04* | (2006.01) | |
| *H01M 2/10* | (2006.01) | |
| *H01M 10/6557* | (2014.01) | |
| *H01M 10/6561* | (2014.01) | |
| *H01M 10/625* | (2014.01) | |
| *H01M 10/647* | (2014.01) | |
| *H01M 10/613* | (2014.01) | |

(52) U.S. Cl.
CPC .......... *H01M 2/14* (2013.01); *H01M 2/1077* (2013.01); *H01M 10/0481* (2013.01); *H01M 10/613* (2015.04); *H01M 10/625* (2015.04); *H01M 10/647* (2015.04); *H01M 10/6557* (2015.04); *H01M 10/6561* (2015.04)

(58) Field of Classification Search
None
See application file for complete search history.

(56) References Cited

U.S. PATENT DOCUMENTS

2006/0246348 A1* 11/2006 Hamada .............. H01M 2/1072
429/148
2015/0056487 A1    2/2015 Kobayashi
(Continued)

FOREIGN PATENT DOCUMENTS

| JP | 2005005167 A | 1/2005 |
|---|---|---|
| JP | 2008-108457 A | 5/2008 |

(Continued)

*Primary Examiner* — Tracy M Dove
(74) *Attorney, Agent, or Firm* — Sughrue Mion, PLLC

(57) ABSTRACT

The present invention provides a battery pack in which a plurality of unit cells and one or a plurality of spacers are alternately arranged in a predetermined arrangement direction and a load is applied in the arrangement direction. The unit cell includes an electrode body having a reaction section, and a battery case having long side surfaces. The spacer includes, on a surface facing the unit cell, a first pressing portion that presses a part of the reaction section. The first pressing portion is configured to press each of the center portion and a pair of end portions of the reaction section in a width direction over the entire length in a vertical direction, and not to press a lower region, which is ⅓ of the reaction section from the lower end in the vertical direction, over a length of ½ or more in the width direction.

4 Claims, 11 Drawing Sheets

(56) References Cited

U.S. PATENT DOCUMENTS

2016/0126604 A1    5/2016   Hiroe
2016/0190634 A1    6/2016   Takahata

FOREIGN PATENT DOCUMENTS

| JP | 2009-259455 A | | 11/2009 |
|---|---|---|---|
| JP | 2010080203 A | * | 4/2010 |
| JP | 2012-113935 A | | 6/2012 |
| JP | 2012-230837 A | | 11/2012 |
| JP | 2013246953 A | | 12/2013 |
| JP | 2016-091665 A | | 5/2016 |
| JP | 2017004833 A | | 1/2017 |
| KR | 10-2016-0078898 A | | 7/2016 |
| WO | 2013124889 A1 | | 8/2013 |

* cited by examiner

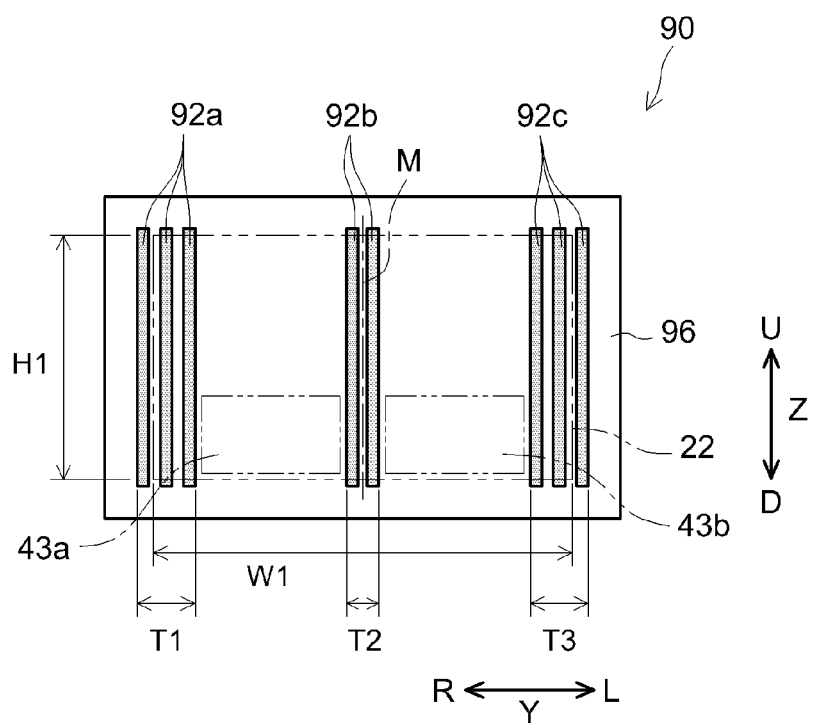

FIG. 11

Table 1

| Portion of reaction section pressed by first pressing portion | | None | One location (center in width direction) | Three locations (both ends and center in width direction) | Two locations (both ends in width direction) | Entire length in width direction |
|---|---|---|---|---|---|---|
| | | | Position in width direction Y (%) *1 | | | |
| | | 0 | 0 to 3.5 | 0 to 10 | 0 to 1 / 90 to 100 | 90 to 100 | 50 to 100 | 0 to 100 |
| Position in height direction Z (%) *2 | 0 to 100 | - | X | X | O | X | X | Reference Example 1 (pressing entire surface); reference |
| | 25 to 75 | - | X | X | X | X | X | - |
| | 35 to 65 | - | X | X | X | X | X | X |
| | 49 to 51 | - | X | X | X | - | X | X |
| | 0 | Reference Example 2 (no pressing) X | - | - | - | - | - | - |

*1. Center line in the width direction is taken as a reference.
*2. Lower end in the height direction is taken as a reference.

BATTERY PACK

CROSS REFERENCE TO RELATED APPLICATIONS

This application claims priority from Japanese Patent Application No. 2017-083785 filed on Apr. 20, 2017, the entire contents of which are incorporated herein by reference.

BACKGROUND OF THE INVENTION

1. Field of the Invention

The present invention relates to a battery pack.

2. Description of the Related Art

A battery pack in which a plurality of unit cells is electrically connected is widely used as a high-output power source for driving a vehicle, and the like. See Japanese Patent Application Publications No. 2016-091665, 2012-230837, 2009-259455, and 2008-108457. For example. Japanese Patent Application Publication No. 2016-091665 discloses a battery pack in which a plurality of unit cells and a plurality of spacers are alternately arranged in a predetermined arrangement direction, and a load is applied to the battery pack in the arrangement direction. The unit cell includes an electrode body having a positive electrode and a negative electrode opposed to each other with a separator interposed therebetween, an electrolytic solution, and a battery case accommodating the electrode body and the electrolytic solution. The spacer includes a plurality of convex ribs on a surface facing the unit cell and has a space for allowing cooling air to flow therethrough. In the battery pack of Japanese Patent Application Publication No. 2016-091665, a load is applied to the entire side surface of the battery case from the arrangement direction by the ribs of the spacer. As a result, the entire electrode body in the battery case is uniformly pressed so that the positive electrode and the negative electrode are pressed against each other.

With the above configuration, the battery pack of Japanese Patent Application Publication No. 2016-091665 can exhibit excellent overcharge tolerance. Thus, batteries are normally used in a state where a voltage is controlled to be within a predetermined range. However, where a current higher than normal is supplied to the battery due to an erroneous operation or the like, the voltage exceeds the predetermined range and overcharge can occur. During overcharge, the electrolytic solution may be electrically decomposed to generate gas, or the separator may be thermally shrunk. In the battery pack of Japanese Patent Application Publication No. 2016-091665, the entire electrode body is uniformly pressed from the arrangement direction. For this reason, even in such a case, it is difficult for the separator to be displaced or contracted. Therefore, the occurrence of internal short circuit during overcharge is suppressed. In addition, dimensional changes of the electrode body in the arrangement direction are suppressed, and swelling of the battery is also suppressed.

SUMMARY OF THE INVENTION

However, the investigation conducted by the inventors of the present invention has demonstrated that where the entire electrode body is uniformly pressed as in the abovementioned battery pack, the electrolytic solution may be pushed out from the system of the electrode body due to expansion and contraction of the positive and negative electrodes and volume expansion of the electrolytic solution at the time of charging and discharging. In particular, in high-rate charging and discharging, since the expansion and contraction of the positive and negative electrodes proceed abruptly, the electrolytic solution is likely to be pushed out from the electrode body by the so-called pump effect. For this reason, where high-rate charging and discharging are repeated, the concentration of the charge carriers may be uneven in the electrode body, or liquid shortage may occur in the electrode body. The resultant problem is that the internal resistance increases and the high rate characteristic deteriorates.

The present invention has been created with the foregoing in view, and it is an object of the present invention to provide a battery pack having both overcharge tolerance and high rate tolerance.

According to the present invention, there is provided a battery pack configured such that a plurality of unit cells and one or a plurality of spacers are alternately arranged in a predetermined arrangement direction and a load is applied in the arrangement direction. The unit cell has an electrode body having a positive electrode and a negative electrode, and a battery case accommodating the electrode body and having a pair of long side surfaces each facing the spacer. The electrode body has, along the long side surface, a reaction section where the positive electrode and the negative electrode are laminated in the arrangement direction in an insulated state. The spacer includes, on a surface facing the long side surface, a first pressing portion that presses a part of the reaction section in the arrangement direction. The first pressing portion is configured such that when a direction orthogonal to a vertical direction of the long side surface is taken as a width direction, the pressing portion presses each of a center portion and a pair of end portions of the reaction section in the width direction over the entire length in the vertical direction, but does not press a lower region, which is 1/3 of the reaction section from the lower end toward the upper end in the vertical direction, over a length of 1/2 or more of the entire length of the reaction section in the width direction.

The electrode body has a pressed portion which is pressed by the first pressing portion at the center portion and both end portions of the reaction section in the width direction. Meanwhile, the electrode body has a non-pressed portion which is not pressed by the first pressing portion in the lower region of the reaction section. The pressing portion functions as a stopper wall that suppresses the movement of the electrolytic solution in the width direction. The non-pressed portion functions as a liquid holding space (liquid reservoir) for holding the electrolytic solution inside the electrode body. Thus, in the battery pack of the above configuration, the electrolytic solution is unlikely to be pushed out of the electrode body even when high-rate charging and discharging are repeated. Further, in the electrode body, dimensional changes in the arrangement direction are unlikely to occur due to the pressing portion. Furthermore, even during overcharge, displacement and shrinkage of the separator are suppressed, and internal short circuit is unlikely to occur in the electrode body. Due to the above effect, it is possible to realize a battery pack having both overcharge tolerance and high rate tolerance.

In a preferred embodiment, the spacer further includes, on a surface facing the long side surface, a second pressing portion which presses a part, of the reaction section in the arrangement direction. The second pressing portion is configured such that, with respect to two divided regions divided by a center line in the width direction of the reaction section, the center portion including the center point of each of the divided regions is pressed over a length in the width direction which is larger than that over which the end portions are pressed. As a result, for example, even when the positive electrode or the negative electrode expands and contracts during charging and discharging, or gas is generated in the battery case at the time of overcharging, the dimensional changes of the reaction section in the arrangement direction are less likely to occur. Therefore, for example, it is possible to suppress the occurrence of local gaps and waviness in the reaction section and maintain a uniform distance between the positive and negative electrodes. As a result, reaction unevenness of charging and discharging is reduced, and a battery pack excellent in cycle characteristics can be realized.

In a preferred embodiment, the electrode body is a flat wound electrode body in which the positive electrode and the negative electrode are laminated and wound in an insulated state, and includes a pair of wound flat portions and a pair of wound R portions interposed between the pair of wound flat portions. One of the pair of wound R portions is disposed on the lower side in the vertical direction and the pair of wound flat portions is disposed along the pair of long side surfaces. This makes it possible for the wound R portion disposed on the lower side to serve as a tray for the electrolytic solution and more effectively prevent the electrolytic solution from flowing out from the lower end of the reaction section. Therefore, it is possible to better hold the electrolytic solution inside the electrode body.

In a preferred embodiment, the first pressing portion is configured to press the pair of end portions of the reaction section in the width direction over a length which is larger than that over which the center portion of the reaction section is pressed. This makes it possible to better suppress the dimensional changes of the reaction section in the arrangement direction. Further, it is possible to better prevent the electrolytic solution from flowing out from both ends of the reaction section in the width direction, and to better hold the electrolytic solution inside the electrode body.

BRIEF DESCRIPTION OF THE DRAWINGS

FIG. 10 is a plan view schematically showing a modified example of the spacer; and FIG. 11 is a table (Table 1) showing a correspondence relationship between a portion pressed by the pressing portion and an overcharge tolerance.

DETAILED DESCRIPTION OF THE PREFERRED EMBODIMENTS

Figure 1:
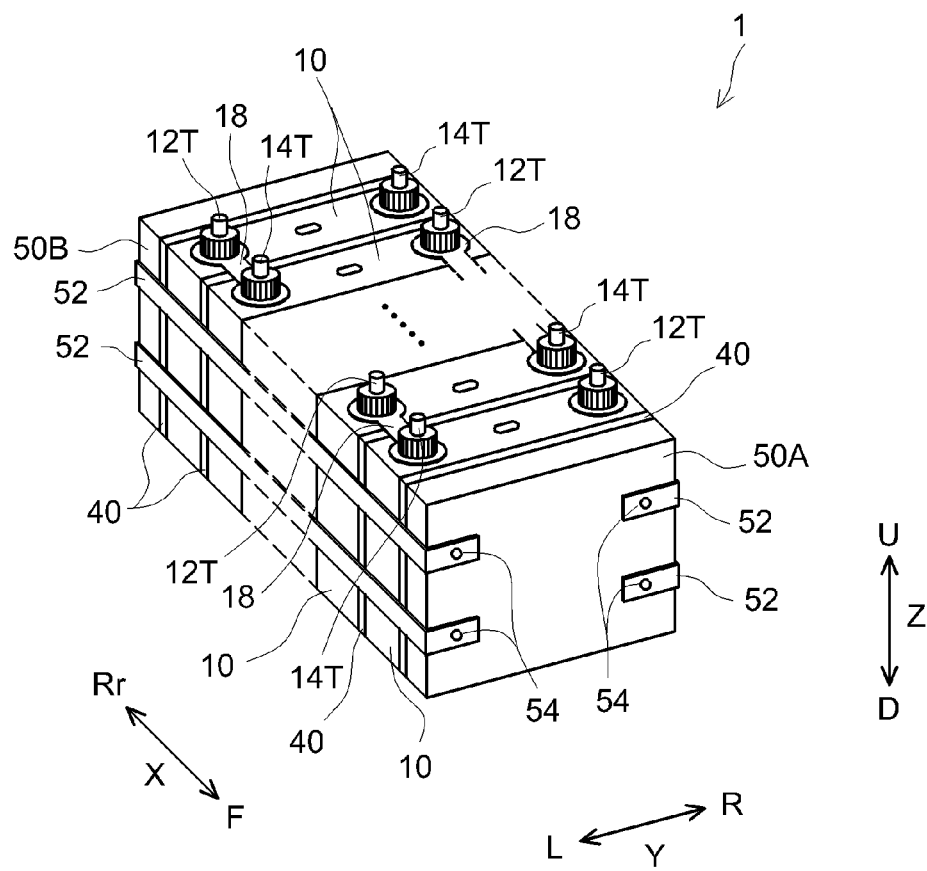
FIG. 1 is a perspective view schematically showing the battery pack of the first embodiment.

Hereinafter, the preferred embodiments of the battery pack disclosed herein will be described by referring, as appropriate, to the drawings. It is to be understood that the embodiments described herein are not intended to limit the invention in any way. The battery pack disclosed herein can be implemented based on the contents disclosed in this description and common technical knowledge in the relevant field.

In addition, in the following drawings, the same reference numerals are assigned to the members and parts that exhibit the same action, and redundant explanation thereof may be omitted or simplified. The letters U, D, F, Rr, L, and R in the drawings are assumed to mean up, down, front, rear, left, and right, respectively. The symbols X, Y, and Z in the drawings are assumed to mean the arrangement direction of the unit cells, the width direction of the wide surface of the unit cell, and the vertical direction of the wide surface of the unit cell, respectively. However, these designations are merely for convenience of explanation, and do not limit the mode of installation of a battery pack 1 at all.

First Embodiment

FIG. 1 is a perspective view schematically showing the battery pack 1 according to a first embodiment. The battery pack 1 includes a plurality of unit cells 10, a plurality of spacers 40, a pair of end plates 50A, 50B, and a plurality of restraint bands 52. The plurality of unit cells 10 is arranged in a predetermined arrangement direction X (the front-rear direction in FIG. 1). The pair of end plates 50A, 50B is disposed at both ends of the battery pack 1 in the arrangement direction X. The plurality of spacers 40 is arranged between the unit cells 10 and the end plates 50A, 50B and between the plurality of unit cells 10 in the arrangement direction X. The plurality of restraint bands 52 is attached so as to bridge the pair of end plates 50A, 50B.

Figure 2:
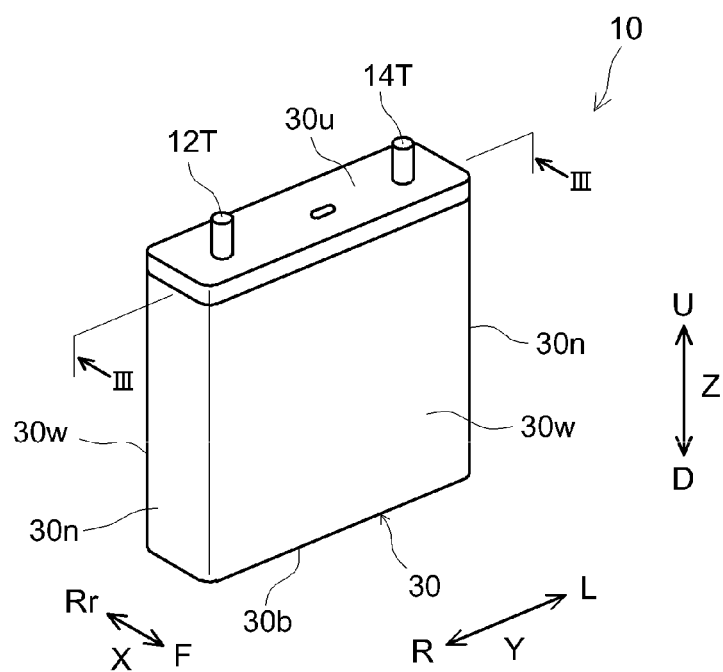
FIG. 2 is a perspective view schematically showing the unit cell shown in FIG. 1.
Figure 3:
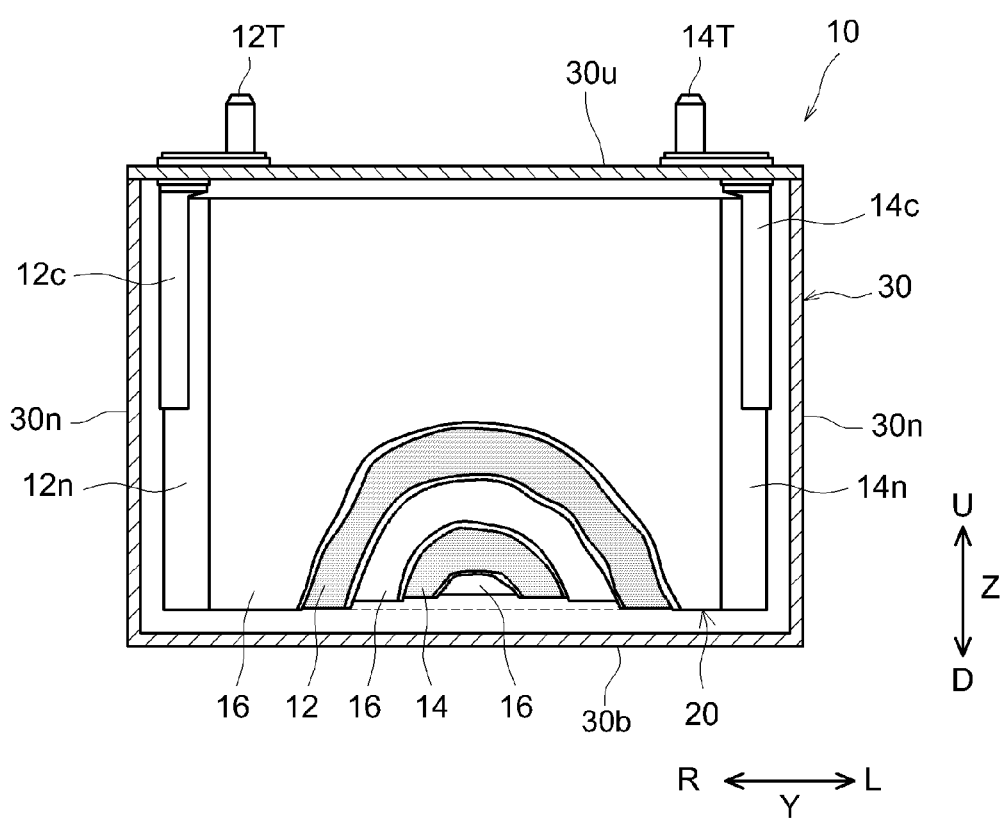
FIG. 3 is a longitudinal sectional view taken along the line in FIG. 2.

FIG. 2 is a perspective view schematically showing the unit cell 10. FIG. 3 is a longitudinal sectional view taken along the line III-III in FIG. 2. The unit cell 10 is typically a secondary battery that can be repeatedly charged and discharged, for example, a lithium ion secondary battery, a nickel hydride battery, an electric double layer capacitor, or the like. The unit cell 10 includes an electrode body 20, an electrolytic solution (not shown), and a battery case 30.

The battery case 30 is a housing for accommodating the electrode body 20 and the electrolytic solution. The battery case 30 is made of a metal, for example, such as aluminum or steel. The battery case 30 of the present embodiment has a bottomed square shape (rectangular parallelepiped shape).

The battery case 30 has an upper surface 30$u$, a bottom surface 30$b$ opposed to the upper surface 30$u$, and a pair of short side surfaces 30$n$ and a pair of long side surfaces 30$w$ as side surfaces continuous with the bottom surface 30$b$. The long side surface 30$w$ is a flat surface. The plurality of unit cells 10 is arranged along the arrangement direction X such that the long side surface 30$w$ of the battery case 30 faces the spacer 40.

A positive electrode terminal 12T and a negative electrode terminal 14T for external connection protrude from the upper surface 30$u$ of the battery case 30. The positive electrode terminal 12T and the negative electrode terminal 14T of the adjacent unit cells 10 are electrically connected by a bus bar 18. As a result, series electric connection is ensured in the battery pack 1. However, the shape, size, number, arrangement, connection method and the like of the unit cells 10 constituting the battery pack 1 are not particularly limited and can be changed as appropriate.

The electrode body 20 and the electrolytic solution are accommodated inside the battery case 30. The configuration of the electrode body 20 and the electrolytic solution may be the same as the conventional ones, and are not particularly limited. The electrolytic solution includes, for example, a nonaqueous solvent and a supporting salt. The supporting salt is, for example, a lithium salt such as $LiPF_6$, $LiBF_4$ or the like.

Figure 4:
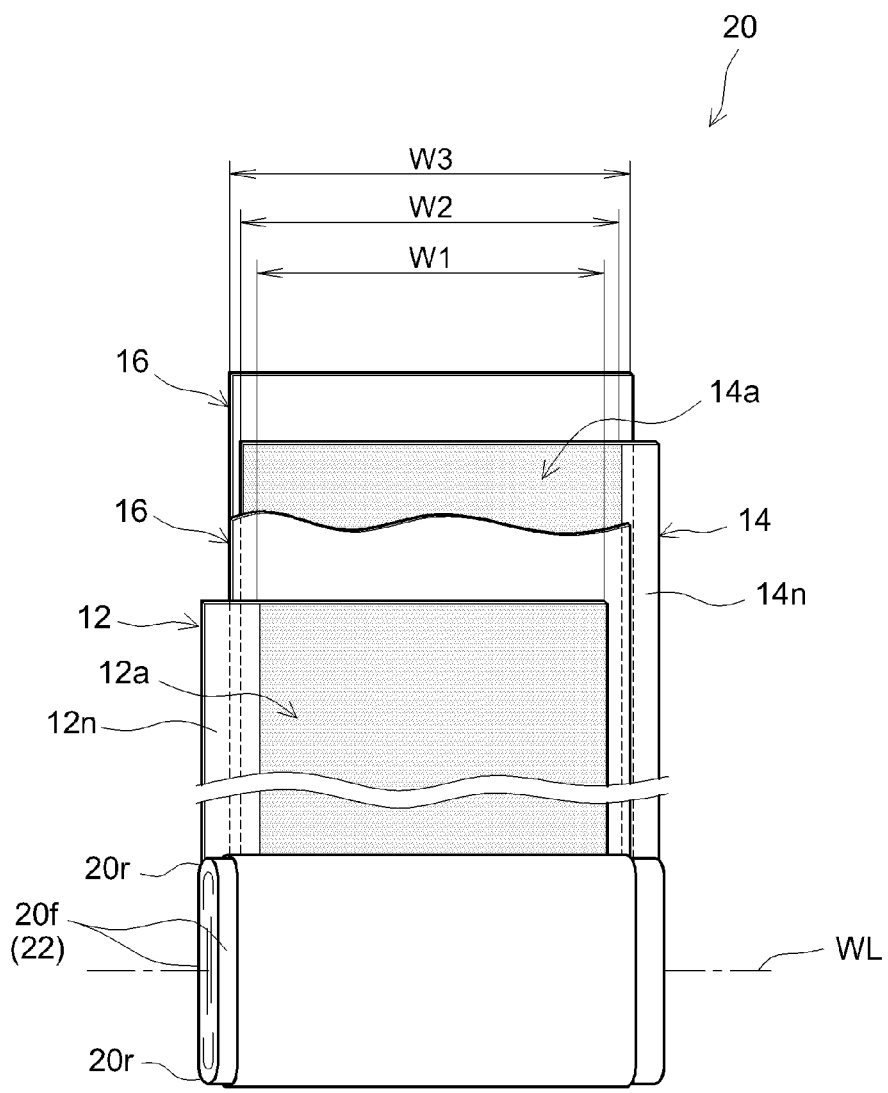
FIG. 4 is an exploded view schematically showing the electrode body shown in FIG. 3.

FIG. 4 is an exploded view schematically showing the electrode body 20. The electrode body 20 is a wound electrode body. The electrode body 20 is configured by laminating a strip-shaped positive electrode 12 and a strip-shaped negative electrode 14 which are insulated from each other with a strip-shaped separator 16 interposed therebetween, and winding around a winding axis WL as a center. The electrode body 20 has a flat outer shape. The electrode body 20 has a pair of wound flat portions 20f and a pair of wound R portions 20r interposed between the pair of wound flat portions 20f in a cross-sectional view orthogonal to the winding axis WL. A pair of end portions of the electrode body 20 in the width direction Y is opened, and the inside and the outside of the electrode body 20 are communicated with each other by the end portions in the width direction Y.

The positive electrode 12 includes a positive electrode current collector and a positive electrode active material layer 12a fixed to the surface thereof. The positive electrode active material layer 12a includes a positive electrode active material capable of reversibly occluding and releasing charge carriers. The negative electrode 14 includes a negative electrode current collector and a negative electrode active material layer 14a fixed to the surface thereof. The negative electrode active material layer 14a includes a negative electrode active material capable of reversibly occluding and releasing the charge carriers. The separator 16 is a porous member that transmits the charge carriers and insulates the positive electrode active material layer 12a and the negative electrode active material layer 14a from each other.

The width W3 of the separator 16 is larger than the width W1 of the positive electrode active material layer 12a and the width W2 of the negative electrode active material layer 14a. The width W2 of the negative electrode active material layer 14a is larger than the width W1 of the positive electrode active material layer 12a. That is, W1, W2, and W3 satisfy W1<W2<W3. In the range of the width W1 of the positive electrode active material layer 12a, the positive electrode active material layer 12a and the negative electrode active material layer 14a are opposed to each other in an insulated state.

At the left end portion of the electrode body 20 in the width direction Y, a positive electrode current collector exposed portion 12n is provided. A positive electrode current collector plate 12c for current collection is attached to the positive electrode current collector exposed portion 12n. The positive electrode 12 of the electrode body 20 is electrically connected to the positive electrode terminal 12T via the positive electrode current collector plate 12c. Further, a negative electrode current collector exposed portion 14n is provided at the right end portion of the electrode body 20 in the width direction Y. A negative electrode current collector plate 14c for current collection is attached to the negative electrode current collector exposed portion 14n. The negative electrode 14 of the electrode body 20 is electrically connected to the negative electrode terminal 14T via the negative electrode current collector plate 14c.

In the unit cell 10, one of the pair of wound R portions 20r of the electrode body 20 is disposed on the bottom surface 30b of the battery case 30, and the other is disposed on the upper surface 30u of the battery case 30. In other words, the pair of wound R portions 20r of the electrode body 20 is arranged above and below in the vertical direction Z. A pair of end portions of the electrode body 20 in the width direction Y is disposed so as to face the pair of short side surfaces 30n of the battery case 30. The pair of wound flat portions 20f of the electrode body 20 is disposed so as to face the pair of long side surfaces 30w of the battery case 30. In other words, the pair of wound flat portions 20f of the electrode body 20 is disposed along the arrangement direction X. In the present embodiment, the range of the width W1 of the positive electrode active material layer 12a of the wound flat portion 20f is the chargeable-dischargeable reaction section 22.

Figure 5:
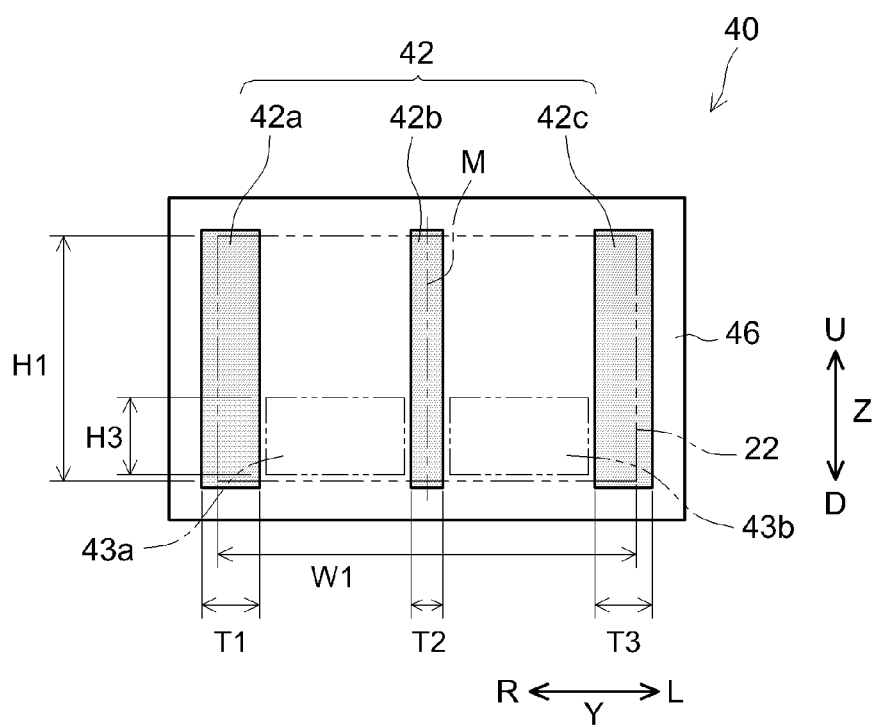
FIG. 5 is a plan view schematically showing the spacer shown in FIG. 1.

FIG. 5 is a plan view schematically showing the spacer 40. The spacer 40 faces the long side surface 30w of the battery case 30. The spacer 40 has a space for allowing a cooling fluid (typically air) to flow through on the surface facing the long side surface 30w. In the spacer 40, for example, the cooling fluid is supplied from the lower side in the vertical direction Z, and the cooling fluid is discharged from the upper side in the vertical direction Z. The spacer 40 serves as a heat radiating plate for efficiently dissipating the heat generated inside the unit cell 10 by charging and discharging or the like. The spacer 40 is a plate-shaped member. The spacer 40 is configured of, for example, a resin material such as polypropylene (PP) or polyphenylene sulfide (PPS) or a metal material having good thermal conductivity.

The spacer 40 has a first convex portion 42 and a base portion 46 on the surface facing the long side surface 30w of the unit cell 10. The first convex portion 42 is formed integrally with the base portion 46. The first convex portion 42 typically has line symmetry with respect to a center line M in the width direction Y. The first convex portion 42 typically has point symmetry with respect to the center of the surface on the side in contact with the long side surface 30w. The first convex portion 42 protrudes along the arrangement direction X. As a result, the first convex portion 42 is in contact with the long side surface 30w even when the unit cell 10 is in a fully discharged state (SOC=0%). The first convex portion 42 is configured to press the contact portion of the long side surface 30w and a peripheral portion thereof. The first convex portion 42 is an example of a first pressing portion.

The first convex portion 42 has three convex portions 42a, 42b, 42c. The three convex portions 42a, 42b, 42c are disposed at positions separated from each other. However, the three convex portions 42a, 42b, 42c may be formed integrally. Each of the three convex portions 42a, 42b, 42c is in a flat plate shape in a plan view. The three convex portions 42a, 42b, 42c protrude with the same length in the arrangement direction X (this is not shown in the figure).

The three convex portions 42a, 42b, 42c are arranged side by side in the width direction Y. The two convex portions 42a, 42c positioned on the left and right in the width direction Y are configured to cover the respective ends of the reaction section 22 of the electrode body 20. The convex portion 42b located in the center in the width direction Y is configured to cover the center of the reaction section 22 of the electrode body 20. By pressing the center and both ends of the reaction section 22 in the width direction Y, it is possible to suppress suitably the dimensional changes of the reaction section 22 in the arrangement direction X during charging and discharging of the unit cells 10. Further, when the unit cell 10 is overcharged, it is possible to suppress suitably the displacement and shrinkage of the separator 16.

In one embodiment, the lengths T1, T3 of the convex portions 42*a*, 42*c* are the same in the width direction Y of the spacer 40. In one embodiment, the lengths T1, T3 of the convex portions 42*a*, 42*c* are larger than the length T2 of the convex portion 42*b*. That is, T1, T2, and T3 satisfy T2<T1=T3. This makes it possible to hold both ends of the reaction section 22 of the electrode body 20 more stably.

Figure 6:
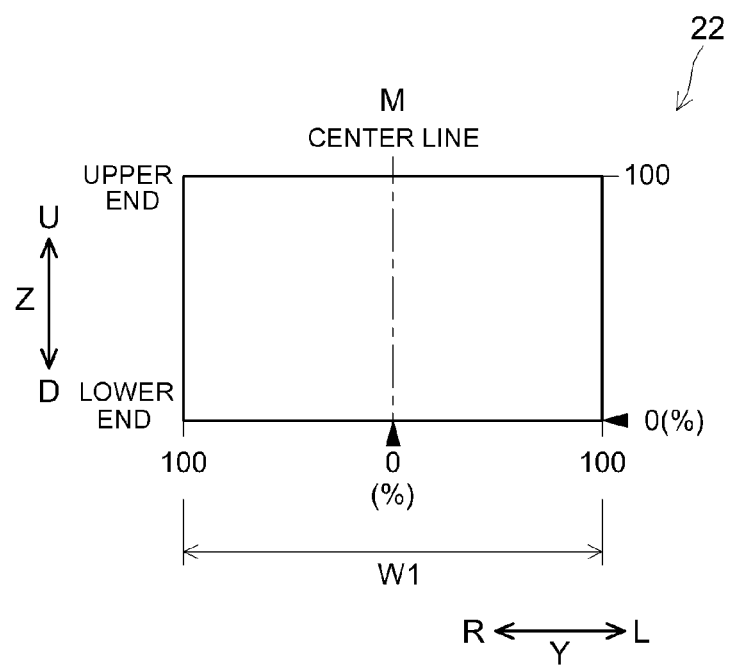
FIG. 6 is a plan view schematically showing the reaction section of the electrode body.

In one embodiment, when the center line M of the reaction section 2 in the width direction Y is taken as a reference (0%) and the length (that is, (W1)/2) to each of the left and right end portions is taken as 100%, the convex portions 42*a*, 42*c* are configured to press over a length of 10% or more from the left and right end portions of the reaction section 22 in the width direction Y toward the center FIG. 6). This makes it possible to better suppress dimensional changes of the reaction section 22 in the arrangement direction X and the displacement of the separator 16. The convex portions 42*a*, 42*c* may be also configured to apply pressure over a length of approximately 10% to 35%, for example, 10% to 20% toward the center from the left and right end portions of the reaction section 22 in the width direction Y. This makes it possible to further improve the high rate tolerance.

In one embodiment, when the lengths to the left and right ends from the center line M of the reaction section 22 in the width direction Y which is taken as the reference (0%) are each taken as 100%, the convex portion 42*b* applies pressure over a length of 1% or more from the center of the reaction section 22 in the width direction Y toward the left and right end portions (see FIG. 6). This makes it possible to better suppress dimensional changes of the reaction section 22 in the arrangement direction X and the displacement of the separator 16. The convex portion 42*b* may be configured to apply pressure over a length of approximately 1% to 10%, for example, 1% to 3.5% from the center of the reaction section in the width direction Y toward the left and right end portions. This makes it possible to further improve the high rate tolerance.

The three convex portions 42*a*, 42*b*, 42*c* linearly extend with the same length H1 in the vertical direction Z. The three convex portions 42*a*, 42*b*, 42*c* are configured to be able to press the center portion and the pair of end portions of the reaction section 22 in the width direction Y over the entire length in the vertical direction Z. As a result, dimensional changes of the reaction section 22 in the arrangement direction X are stably suppressed over a long period of time. Further, at the time of overcharging, displacement and shrinkage of the separator 16 are unlikely to occur, and occurrence of internal short circuit is suppressed at a high level.

The base portion 46 of the spacer 40, that is, the portion where the convex portion 42 is not formed, is configured so as not to contact the long side surface 30*w* at least when the unit cell 10 is in the fully discharged state (SOC=0%). Therefore, a portion of the reaction section 22 which faces the base portion 46 is configured so as not to be pressed by the spacer 40. In the present embodiment, the base portion 46 is interposed between the convex portions 42*a*, 42*b* and between the convex portions 42*b*, 42*c*, respectively. That is, the spacer 40 has the first convex portion 42 pressing the reaction section 22 and the portion not pressing the reaction section 22.

In the present embodiment, the lower region which is at least ⅓ of the reaction section 22 from the lower end in the vertical direction Z faces non-pressing portions 43*a*, 43*b* of the spacer 40 over a predetermined length. As a result, a part of the lower region of the reaction section 22 is configured not to be pressed. With the passage of time, the electrolytic solution tends to be unevenly distributed downward in the vertical direction Z due to gravity. The non-pressed portion of the lower region functions as a liquid holding space for storing the electrolytic solution inside the reaction section 22. Due to the lower region of the above configuration, the electrolytic solution is unlikely to be pushed out of the reaction section 22. Furthermore, even if the electrolytic solution is pushed out of the reaction section 22, the electrolytic solution accumulated below the battery case 30 can be advantageously drawn up to the reaction section 22 by the straw effect.

The non-pressing portions 43*a*, 43*b* may have any total length in the width direction Y as long as it covers a half (that is, 50%) or more of the entire length W1 of the reaction section 22 in the width direction Y. The total length of the non-pressing portions 43*a*, 43*b* in the width direction Y may be 55% or more, for example, 75% or more of the entire length W1 of the reaction section 22 in the width direction Y. This makes it possible to further improve the high rate tolerance.

In one embodiment, when the center line M of the reaction section 2 in the width direction Y is taken as a reference (0%) and the length (that is, (W1)/2) to each of the left and right end portions is taken as 100%, the non-pressing portions 43*a*, 43*b* are configured so as not to press portions of the reaction section 22 having a length of 3.5% to 80%, for example, portions having a length of 10% to 65%, in the width direction Y (see FIG. 6). This makes it possible to further prove the high rate tolerance.

The non-pressing portions 43*a*, 43*b* may have any length H3 in the vertical direction Z as long as each non-pressing portion covers at least ⅓ from the lower end in the vertical direction Z. In other words, when the lower end of the reaction section 22 in the vertical direction Z is taken as the reference (0%) and the total length to the upper end is taken as 100%, the non-pressing portions 43*a*, 43*b* may have any length H3 in the vertical direction Z as long as each non-pressing portion covers a portion of 33% from the lower end of the reaction section 22 (see FIG. 6). The length H3 of the non-pressing portions 43*a*, 43*b* in the vertical direction Z may be ½ (50%) or more, for example, 100%, from the lower end in the vertical direction Z. This makes it possible to further improve the high rate tolerance.

The end plates 50A, 50B are disposed at both ends of the battery pack 1 and sandwich the plurality of unit cells 10 and the plurality of spacers 40 in the arrangement direction X. The restraint band 52 is fixed to the end plates 50A, 50B by screws 54. The restraint band 52 is attached so that a predetermined restraining pressure is applied in the arrangement direction X. The restraint band 52 is attached, for example, so that the surface pressure at a portion in contact with the convex portions 42*a*, 42*b*, 42*c* of the unit cell 10 is about $2\times10^6$ to $5\times10^6$ Pa. As a result, a load is applied to the plurality of unit cells 10 and the plurality of spacers 40 from the arrangement direction X, and the battery pack 1 is integrally held.

As described above, the electrode body 20 of the battery pack 1 has portions to be pressed in the center portion and the pair of end portions of the reaction section 22 in the width direction Y. Meanwhile, the electrode body 20 has a portion which is not pressed in the lower region of the reaction section 22 in the vertical direction Z. The portions to be pressed function as stopper walls for suppressing the movement of the electrolytic solution in the width direction Y. The non-pressed portion functions as a reservoir for holding the electrolytic solution in the reaction section 22. Thus, in the battery pack 1, the electrolytic solution can be suitably stored inside the electrode body 20. Therefore, in the battery pack 1, the electrolytic solution is unlikely to be pushed out of the system of the electrode body 20 even when high rate charging and discharging are repeated. Further, in the electrode body 20, dimensional changes of the reaction section 22 in the arrangement direction X are suitably suppressed by the portions to be pressed. Furthermore, in the electrode body 20, even when the unit cell 10 is overcharged, displacement and shrinkage of the separator 16 can be suitably suppressed by the portions to be pressed. The combination of these effect makes it possible for the battery pack 1 to combine excellent overcharge tolerance with excellent high rate tolerance.

Although the battery pack 1 can be used for various purposes, it is characterized by having both overcharge tolerance and high rate tolerance. These specific features make it possible to suitably use the battery pack 1, for example, as a motion power source (driving power source) for a motor mounted on a vehicle. The type of the vehicle is not particularly limited, and typically includes automobiles, for example, plug-in hybrid vehicles (PHV), hybrid vehicles (HV), electric vehicles (EV), and the like.

Second Embodiment

Figure 7:
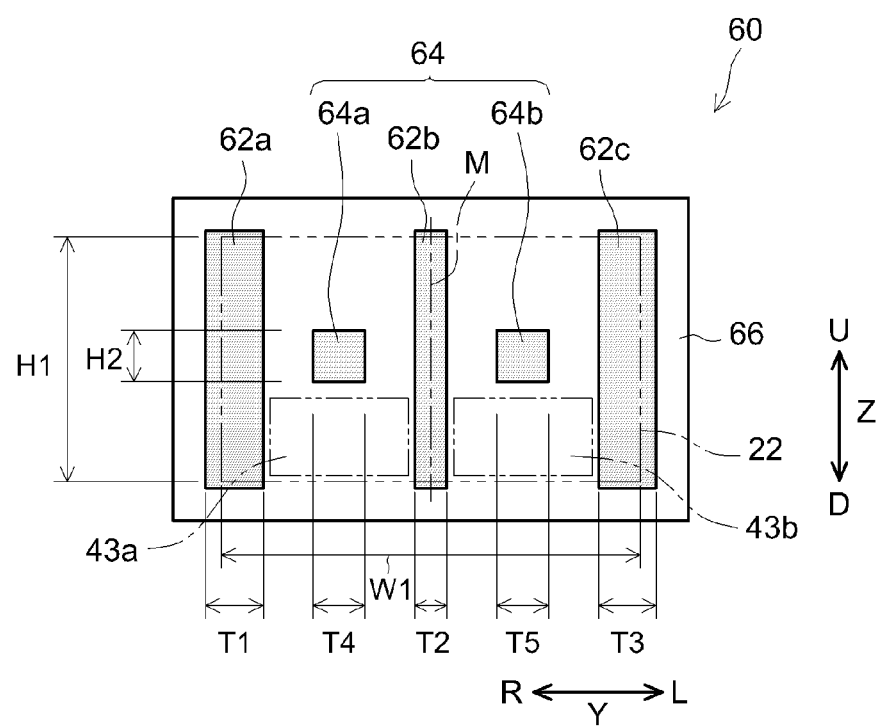
FIG. 7 is a plan view schematically showing the spacer according to the battery pack of the second embodiment.

FIG. 7 is a plan view schematically showing a spacer 60 of the battery pack of the second embodiment. Since the components of the battery pack other the spacer 60 are the same as in the above-described first embodiment, a detailed description thereof will be omitted. The spacer 60 has three first convex portions 62a, 62b, 62c, two second convex portions 64, and a base portion 66 on the surface on the side that is in contact with the long side surface 30w of the unit cell 10. The first convex portions 62a, 62b, 62c are the same as the convex portions 42a, 42b, 42c of the spacer 40 of the first embodiment. The second convex portion 64 is formed integrally with the base portion 66. The second convex portion 64 typically has line symmetry with respect to the center line M in the width direction Y. The second convex portion 64 typically has point symmetry with respect to the center of the surface on the side in contact with the long side surface 30w. The second convex portion 64 protrudes along the arrangement direction X in the same manner as the first convex portions 62a, 62b, 62c. The first convex portions 62a, 62b, 62c and the second convex portion 64 are thus configured to be in contact with the long side surface 30w of the unit cell 10 and press the contact portion. The second convex portion 64 is an example of a second pressing portion.

The second convex portion 64 has two convex portions 64a, 64b. The second convex portions 64a, 64b are each configured so as to press the respective center portion including the center point of each of the divided regions of the two divided regions of the reaction section 22 divided by the center line M in the width direction Y. The second convex portions 64a, 64b are disposed at positions separated from each other. The second convex portion 64a is disposed between the first convex portions 62a, 62b in the width direction Y. The second convex portion 64b is arranged between the first convex portions 62b, 62c in the width direction Y. However, the second convex portions 64a, 64b may be connected, for example, by the first convex portion 62b. For example, the second convex portions 64a, 64b may be formed integrally with the first convex portions 62a, 62b, 62c. The second convex portions 64a, 64b have a flat plate shape in a plan view. Each of the second convex portions 64a, 64b protrudes in the arrangement direction X with the same length as the first convex portions 62a, 62b, 62c (this is not shown in the figure).

In one embodiment, the lengths T4 and T5 of the second convex portions 64a, 64b are the same in the width direction Y of the spacer 60. In one embodiment, the lengths T4, T5 of the second convex portions 64a, 64b are larger than the lengths T1, T3 of the convex portions 62a, 62c pressing the left and right end portions of the reaction section 22 in the width direction Y, and larger than the length T2 of the convex portion 62b pressing the center portion of the reaction section 22 in the width direction Y. That is, T1 to T5 satisfy T2≤T1=T3<T4=T5. This makes it possible to suppress the occurrence of local gaps and waviness in the reaction section 22 and to keep a uniform distance between the positive electrode 12 and the negative electrode 14.

In one embodiment, when the center line M of the reaction section 22 in the width direction Y is taken as a reference (0%) and the length (that is, (W1)/2) to each of the left and right end portions is taken as 100%, the second convex portions 64a, 64b are each configured to press over the length of 20% or more of the reaction section 22 (see FIG. 6). This makes it possible to better suppress the dimensional changes of the reaction section 22 in the arrangement direction X, the displacement of the separator 16, and the like. The second convex portions 64a, 64b may be configured to press over a length of approximately 27% to 50%, for example, 25% to 50% in the width direction Y. This makes it possible to improve high rate tolerance.

In one embodiment, when the center line M of the reaction section 22 in the width direction Y is taken as a reference (0%) and the length to each of the left and right end portions is taken as 100%, the second convex portion 64a, 64b are configured to press portions having a length of 20% to 70%, for example, a length of 33% to 60% of the reaction section 22 in the width direction Y. This makes it possible to further reduce reaction unevenness in charging and discharging.

The second convex portions 64a, 64b linearly extend in the vertical direction Z with the same length H2. The length H2 of the second convex portions 64a, 64b in the vertical direction is less than the length H1 of the convex portions 62a, 62b, 62c in the vertical direction.

In one embodiment, when the lower end of the reaction section 22 in the vertical direction Z is taken as the reference (0%) and the total length to the upper end is taken as 100%, the second convex portions 64a, 64b are each configured to press a part having a length of 10% or more, for example, a part having a length of 18% or more (see FIG. 6). This makes it possible to better suppress the dimensional changes of the reaction section 22 and the displacement of the separator in the arrangement direction X and to further improve the high rate tolerance.

As a result of providing the spacer 60 with the second convex portions 64a, 64b in addition to the first convex portions 62a, 62b, 62c, as described hereinabove, the ratio of the portions in the reaction section 22 which are to be pressed is increased. As a result, for example, even when the positive electrode 12 and the negative electrode 14 are expanded and contracted with charging and discharging, it is possible to suppress the occurrence of local deformation such as gaps or waviness inside the electrode body 20. Therefore, it is possible to maintain a uniform distance between the positive electrode 12 and the negative electrode 14 of the reaction section 22 and reduce reaction unevenness in charging and discharging. As a result, it is possible to achieve both high rate tolerance and cycle characteristics at a high level.

Several examples relating to the present invention will be described below, but the present invention is not intended to be limited to the configurations shown in the specific examples.

Test Example 1-1

Here, the overcharge tolerance when changing the position and size of the pressing portion was evaluated with respect to the reaction section of the electrode body. First, a unit cell having an electrode body, and a spacer (see FIG. 5) having a pressing portion configured to be able to press a part of the reaction section as shown in Table 1, depicted in FIG. 11, were prepared. In Reference Examples 1 and 2, a spacer for pressing the entire reaction section and a spacer not pressing the entire reaction section were prepared. Next, the unit cell and the spacer facing the long side surface of the unit cell were together restrained. Then, an overcharge test was performed. Specifically, in a temperature environment of −10° C., constant-current charging was performed at a charge rate of 9 C until the unit cell was overcharged, and the withstand voltage at this time was evaluated.

FIG. 11, which depicts Table 1, shows the correspondence relationship between the portion pressed by the pressing portion and the overcharge tolerance. In Table 1 of FIG. 11, the withstand voltage of Reference Example 1 in which the entire electrode body is pressed is taken as a reference, examples in which the decrease in withstand voltage is less than 10 V of the reference are shown as "O: overcharge tolerance the same as in Reference Example 1", and examples in which the decrease in withstand voltage is equal to or more than 10 V of the reference are shown as "X: overcharge tolerance the same as in Reference Example 1". In addition, when each test was conducted a plurality of times, the variation of the result was within ±3%.

As shown in Table 1 of FIG. 11, when the reaction section was pressed only at the center (one location) or both ends (two locations) in the width direction Y, the overcharge resistance was low. Further, even in the case in which the reaction section was pressed at a total of three locations in the width direction Y, that is, at the center and at both end portions, when there was a portion not pressed in the height direction Z, the overcharge tolerance was low. Meanwhile, when the reaction section was pressed at a total of three locations in the width direction Y, that is, at the center and at both end portions, over the entire length in the height direction Z at each location, that is, from the lower end (0%) to the upper end (100%), excellent overcharge tolerance equivalent to that of Reference Example 1 was realized.

Test Example 1-2

Here, the high rate tolerance when changing the position and size of the non-pressing portion was evaluated with respect to the reaction section of the electrode body. First, a spacer configured not to press a part of the reaction section as shown in Table 2 was prepared. In Reference Examples 1 and 2, a spacer for pressing the entire reaction section and a spacer not pressing the entire reaction section were prepared in the same manner as in Test Example 1-1. Next, the unit cell and the spacer facing the long side surface of the unit cell were together restrained in the same manner as in Test Example 1-1, Then, a high-rate charging and discharging test was performed. Specifically, in a temperature environment of 25° C., the operation of constant-current charging at a charge rate of about 30 C and then constant-current discharging at a discharge rate of about 2.5 C was taken as 1 cycle, and this cycle was repeated a predetermined number of times. Then, the resistance increase rate (%) was calculated from the resistance values before and after the high-rate cycling.

Table 2 shows the correspondence relationship between the portion not pressed by the pressing portion and the high rate tolerance. In Table 2, the resistance increase rate of Reference Example 1 in which the entire electrode body is pressed is taken as a reference, examples in which the decrease in resistance increase rate is equal to or greater than 10% of the reference are shown as "O: high rate tolerance is superior to that in Reference Example 1", among them the examples in which the decrease in resistance increase rate is particularly excellent are shown as "O O: particularly excellent high rate tolerance", and examples in which the decrease in resistance increase rate was less than 10% are shown as "X: high rate tolerance is the same as in Reference Example 1". Further, the numbers in parentheses in Table 2 are percentages (%) of "non-pressing portions" in the total length in the width direction. In addition, when each test was conducted a plurality of times, the variation of the result was within ±3%.

TABLE 2

| Portion of reaction section which is not pressed | | Position in width direction Y (%) [1] | | | | | |
|---|---|---|---|---|---|---|---|
| | | 100 | 3.5 to 80 | 10 to 65 | 10 to 50 | 20 to 65 | 0 |
| Position in height direction Z (%) [2] | 0 | — | — | — | — | — | Reference Example 1 (pressing entire surface); reference |
| | 0 to 25 | — | X | X | X | X | — |
| | 0 to 33 | — | O O (76.5%) | O (55%) | X (40%) | X (45%) | — |

TABLE 2-continued

| Portion of reaction section | Position in width direction Y (%) [*1] | | | | | |
|---|---|---|---|---|---|---|
| which is not pressed | 100 | 3.5 to 80 | 10 to 65 | 10 to 50 | 20 to 65 | 0 |
| | 100 | Reference Example 2 (no pressing) O O | O O (76.5%) | O (55%) | X (40%) | X (45%) | — |

[*1] Center line in the width direction is taken as a reference
[*2] Lower end in the height direction is taken as a reference
Numbers in parentheses in are percentages (%) of "non-pressing portions" in total length in width direction.

As shown in Table 2, the high rate tolerance superior to that of Reference Example 1 was realized when the following portions of the reaction section were not pressed:

(1) a portion which is ⅓ from the lower end toward the upper end in the height direction Z; and (2) a portion which is 50% (half) or more in the width direction Y on each of the right and left sides when the center line M in the width direction Y is taken as the reference (0%) and the lengths to the left and right end portions are each taken as 100%.

TEST EXAMPLE 2

Here, high rate tolerance and high-temperature cycle characteristic were evaluated when the position and size of the portion to be pressed on the reaction section of the electrode body were changed. First, a spacer (see FIG. 6) having a first pressing portion configured to be able to press at three locations in the width direction Y shown in Table 1 of FIG. 11 and a second pressing portion configured to be able to press the portion shown in Table 3 was prepared. Next, the unit cell and the spacer facing the long side surface of the unit cell were together restrained in the same manner as in Test Example 1-2. Then, a high-rate charging and discharging test and a high-temperature cycle test were performed. The high-rate charging and discharging test was the same as in Test Example 1-2. In the high-temperature cycle test, the operation of high-rate charging at a charge rate of approximately 2 C in a temperature environment of 60° C. and then low-rate discharging at a discharge rate of 1 C or less was taken as one cycle, and this cycle was repeated a predetermined number of times. Then, the resistance increase rate (%) was calculated from the resistance values before and after the high-rate cycling.

Table 3 shows the correspondence relationship between the portion pressed by the second pressing portion and the high rate tolerance and high-temperature cycle characteristic. The notation of high rate tolerance is the same as in Test Example 1-2, Further, in the high-temperature cycle test, the resistance increase rate of Reference Example 1 in which the entire electrode body was pressed is taken as a reference, examples in which the decrease in resistance increase rate is equal to or greater than 5% of the reference are shown as "O: cycle characteristic is the same as in Reference Example 1", and examples in which the decrease in resistance increase rate is less than 5% of the reference are shown as "X: cycle characteristic is inferior to that in Reference Example 1".

TABLE 3

| Portion of reaction section pressed by | Position in width direction Y (%) [*1] | | | | |
|---|---|---|---|---|---|
| second pressing portion | 0 (no pressing) | 40 to 50 | 33 to 60 | 20 to 70 | 0 to 100 |
| | Position in height direction Z (%) [*2] | | | | |
| | 0 (no pressing) | 45 to 63 | | | |
| High rate tolerance | O | O | O | O | O |
| High-temperature cycle characteristic | X | X | O | O | O |

[*1] Center line in the width direction is taken as a reference
[*2] Lower end in the height direction is taken as a reference As shown in Table 3, the high rate tolerance in any of the examples was superior to that of Reference Example 1. This is thought to be because the part of the reaction section was not pressed. Further, a high cycle characteristic superior to that in Reference Example 1 was realized because the following portions of the two regions of the reaction section on the left and right sides which were divided by the center line M in the width direction Y were pressed with line symmetry: (1) portions each including the center point of the respective left or right region; and (2) a portion longer than the portion pressed by the first pressing portion in the width direction Y.

Although the present invention has been described in detail, the above embodiments and examples are merely exemplary, and the invention disclosed herein includes various modifications and variations of the above-described specific examples.

For example, in the above embodiment, the electrode body 20 was a wound electrode body, but such a configuration is not limiting. For example, the electrode body 20 may be a laminated electrode body in which a rectangular positive electrode and a rectangular negative electrode are laminated in an insulated state. The laminated electrode body has a pair of rectangular flat surfaces and four laminated surfaces (end surfaces) connecting the pair of flat surfaces. The laminated electrode body is typically disposed inside the battery case 30 so that the flat surfaces thereof face the long side surfaces 30w of the unit cell 10. The electrode body of such a mode can also be advantageously used in the unit cell 10.

For example, in the above-described first embodiment, the portions other than the convex portions 42a, 42b, 42c of the spacer 40 were all the base portion 46. Further, in the second embodiment described above, the portions other than the convex portions 62a, 62b, 62c, 64a, 64b of the spacer 60 were all the base portion 66. However, such configurations are not limiting. The portions other than the convex portions 42a, 42b, 42c, 62a, 62b, 62c, 64a, 64b of the spacers 40, 60 may protrude toward the side in the arrangement direction X as long as these portions are not in contact with the long side surfaces 30w of the unit cell 10 in a state in which the battery pack is restrained by the restraint band 52.

For example, in the above-described embodiments, the convex portions 42a, 42b, 42c of the spacer 40 and the convex portions 62a, 62b, 62c, 64a, 64b of the spacer 60 are arranged to be separated from each other. However, such configurations are not limiting.

Figure 8:
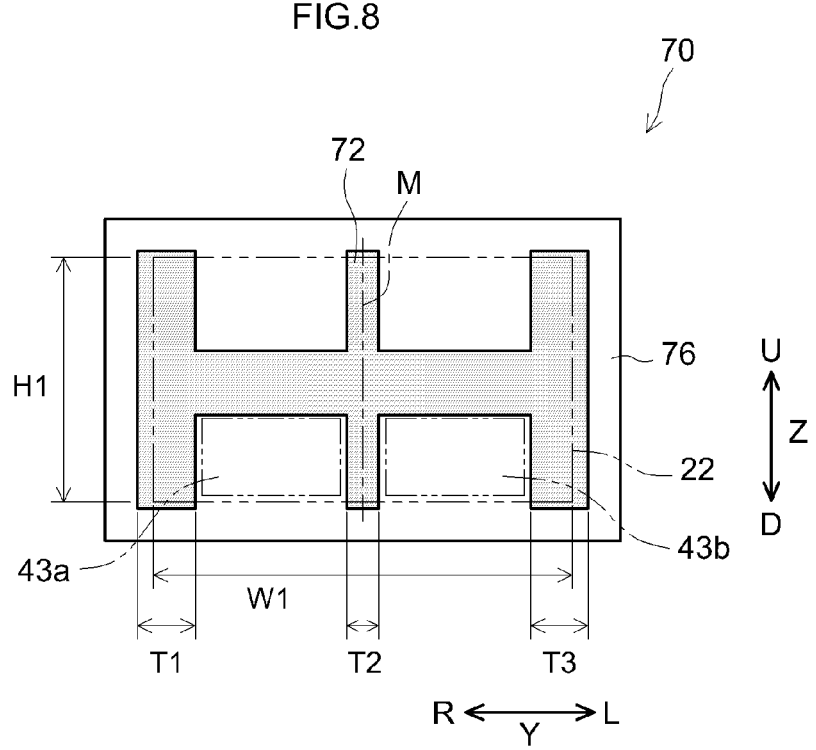
FIG. 8 is a plan view schematically showing a modified example of the spacer.

FIG. 8 is a plan view schematically showing a spacer 70. The spacer 70 has a convex portion 72 and a base portion 76. In this way, the convex portion may be formed integrally. According to the study conducted by the inventors of the present invention, the spacer 70 of such a mode can also be preferably used in the battery pack 1, in the same manner as the spacers 40, 60.

Figure 9:
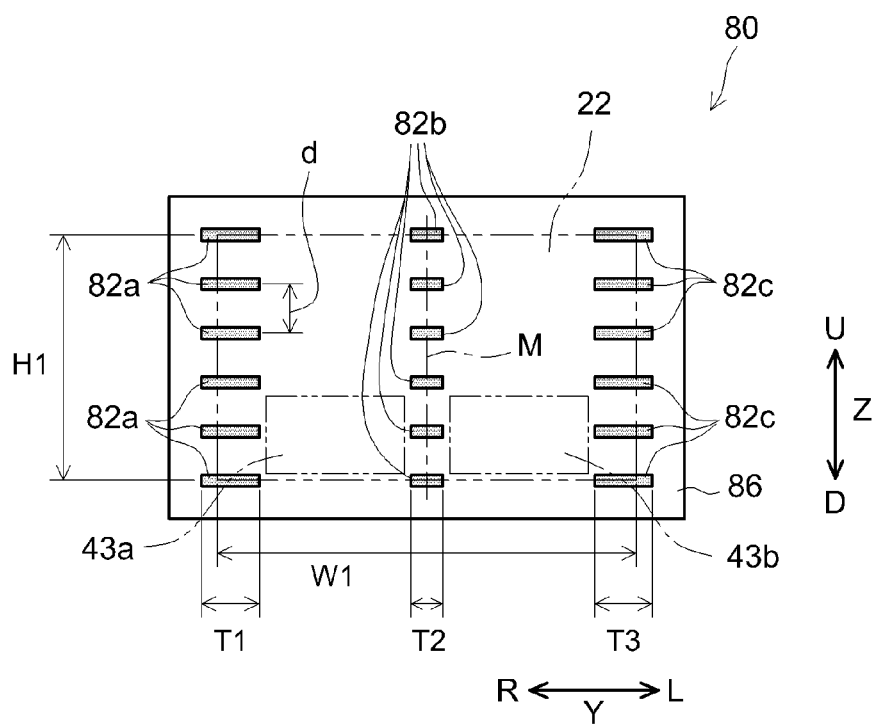
FIG. 9 is a plan view schematically showing a modified example of the spacer.

For example, in the above-described embodiment, the convex portions 42a, 42b, 42c of the spacer 40 had a flat plate shape in a plan view, but such a configuration is not limiting. FIG. 9 is a plan view schematically showing a spacer 80. The spacer 80 has comb-shaped first convex portions 82a, 82b, 82c and a base portion 86 on a surface facing the long side surface 30w of the unit cell 10. Each of the first convex portions 82a, 82b, 82c includes a plurality of convex ribs arranged at equal intervals in the vertical direction Z. Each convex rib extends along the width direction Y. Each convex rib protrudes to the same height on the side in the arrangement direction X. The first convex portions 82a, 82b, 82c have concavo-convex shapes when viewed from the arrangement direction X. As a result, in the first convex portions 82a, 82b, 82c, a plurality of grooves usable as a flow path for a cooling fluid are formed along the width direction Y. The left and right of the plurality of grooves in the width direction Y are opened. A pitch d of the convex ribs is, for example, 1 mm to 10 mm. In the present embodiment, d=7.5 mm. Further, the projecting height of the convex ribs in the arrangement direction X is, for example, 5 mm to 8.5 mm. With such a pitch d and protrusion height, the center and the pair of end portions of the reaction section 22 can be flatly pressed in the same manner as when using the spacer 40 having the flat plate-shaped convex portions 42a, 42b, 42c. According to the research conducted by the inventors of the present invention, the spacer 80 of such a mode can also be preferably used in the battery pack 1 similarly to the spacers 40, 60.

In FIG. 9, each convex rib extends along the width direction Y, but such a configuration is not limiting. FIG. 10 is a plan view schematically showing a spacer 90. The spacer 90 has comb-like first convex portions 92a, 92b, 92c and a base portion 96 on a surface facing the long side surface 30w of the unit cell 10. Each of the first convex portions 92a, 92b, 92c includes a plurality of convex ribs arranged at equal intervals in the width direction Y. Each convex rib extends along the vertical direction Z. As a result, in the first convex portions 92a, 92b, 92c, a plurality of grooves is opened on top and bottom in the vertical direction Z. According to the research conducted by the inventors of the present invention, the spacer 90 of such a mode can also be advantageously used in the battery pack 1 similarly to the spacers 40, 60.

For example, when a plurality of spacers is used in one battery pack, the spacers may be of one type (that is, all the spacers are of the same shape), or two or more types of spacers (for example, spacers that differ in the shape of convex portions) may be used in combination. For example, two or more of the spacers 40, 60, 70, 80, 90 such as shown in FIGS. 5 and 7 to 10 may be combined as appropriate.

For example, when a spacer is interposed between the two unit cells 10, the spacer has a pair of surfaces facing the long side surfaces 30w of the unit cells 10. At this time, it is not always necessary for the pair of surfaces of the spacer facing the long side surfaces 30w to have convex portions of the same shape on both surfaces, for example, to make the shape of the convex portions different between one surface and the other surface. Further, in the case where a spacer is interposed between the unit cell 10 and the end plate 50A, the spacer may or may not have a convex portion on the surface facing the end plate 50A.

The terms and expressions used herein are for description only and are not to be interpreted in a limited sense. These terms and expressions should be recognized as not excluding any equivalents to the elements shown and described herein and as allowing any modification encompassed in the scope of the claims. The present invention may be embodied in many various forms. This disclosure should be regarded as providing preferred embodiments of the principle of the present invention. These preferred embodiments are provided with the understanding that they are not intended to limit the present invention to the preferred embodiments described in the specification and/or shown in the drawings. The present invention is not limited to the preferred embodiment described herein. The present invention encompasses any of preferred embodiments including equivalent elements, modifications, deletions, combinations, improvements and/or alterations which can be recognized by a person of ordinary skill in the art based on the disclosure. The elements of each claim should be interpreted broadly based on the terms used in the claim, and should not be limited to any of the preferred embodiments described in this specification or used during the prosecution of the present application.

What is claimed is:

1. A battery pack comprising:
a plurality of unit cells and at least one spacer, wherein the plurality of unit cells and the at least one spacer are alternately arranged in an arrangement direction and a load is applied in the arrangement direction;
each unit cell of the plurality of unit cells comprises:
an electrode body having a positive electrode and a negative electrode; and
a battery case accommodating the electrode body and having a pair of long side surfaces, at least one of the pair of the long side surfaces of the battery case facing the at least one spacer;
the electrode body has, along a direction in which the pair of long side surfaces of the battery case are arranged, a reaction section in which the positive electrode and the negative electrode are laminated in the arrangement direction in an insulated state;
the at least one spacer includes, on a surface thereof facing a long side surface of the pair of long side surfaces of the battery case, a first pressing portion that presses a first part of the reaction section in the arrangement direction;
the first part of the reaction section of which the first pressing portion presses includes
a first center portion and a pair of end portions, each extending in a width direction of the long side surface of the pair of long side surfaces of the battery case, which is orthogonal to a vertical direction of the long side surface of the pair of long side surfaces of the battery case, the first pressing portion presses each of the first center portion and the pair of end portions of the reaction section along an entire height of these respective portions in the vertical direction of the long side surface of the pair of long side surfaces of the battery case; and the first pressing portion does not press a lower region of the reaction section, the lower region of the reaction section including ⅓ of an entire height of the reaction section, as measured from a lower end of the reaction section to an upper end of the reaction section in the vertical direction of the long side surface of the pair of long side surfaces of the battery case, and the lower region of the reaction section extending over a length of ½ or more of an entire length of the reaction section in the width direction of the long side surface of the pair of long side surfaces of the battery case.

2. The battery pack according to claim 1, wherein
the at least one spacer further comprises, on the surface thereof facing the long side surface of the pair of long side surfaces of the battery case, a second pressing portion that presses a second part of the reaction section in the arrangement direction, wherein
the second pressing portion presses second center portions, each including a center point of each of divided regions of two divided regions of the reaction section divided by a center line which divides the reaction section in the width direction of the long side surface of the pair of long side surfaces of the battery case.

3. The battery pack according to claim 1, wherein
the electrode body is a flat wound electrode body in which the positive electrode and the negative electrode are laminated and wound in the insulated state, the electrode body including:
a pair of wound flat portions and a pair of wound R-curved portions interposed between the pair of wound flat portions; wherein
one of the pair of the wound curved portions is disposed on a lower side in the vertical direction of the long side surface of the pair of long side surfaces of the battery case, as compared to the other one of the pair of the wound curved portions; and
the pair of wound flat portions is disposed so as to be along the pair of the long side surfaces of the battery case.

4. The battery pack according to claim 1, wherein
the first pressing portion is configured to press the pair of end portions of the reaction section along a length longer than a length along which the first pressing portion is configured to press the first center portion of the reaction section in the width direction of the long side surface of the pair of long side surfaces of the battery case.

* * * * *